United States Patent
Funk et al.

(10) Patent No.: US 9,200,146 B2
(45) Date of Patent: Dec. 1, 2015

(54) ADDITION-CROSSLINKING SILICONE COMPOSITION WITH LOW COMPRESSION SET

(71) Applicant: Wacker Chemie AG, Munich (DE)

(72) Inventors: Enno Funk, Mehring (DE); Martin Lex, Mehring (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/417,468

(22) PCT Filed: Jul. 10, 2013

(86) PCT No.: PCT/EP2013/064609
§ 371 (c)(1),
(2) Date: Jan. 26, 2015

(87) PCT Pub. No.: WO2014/016122
PCT Pub. Date: Jan. 30, 2014

(65) Prior Publication Data
US 2015/0203664 A1    Jul. 23, 2015

(30) Foreign Application Priority Data
Jul. 27, 2012  (DE) .......... 10 2012 213 260

(51) Int. Cl.
| | |
|---|---|
| C08L 83/04 | (2006.01) |
| C08K 9/04 | (2006.01) |
| C08K 5/3472 | (2006.01) |
| C09C 1/30 | (2006.01) |
| C01B 33/18 | (2006.01) |
| C09C 3/00 | (2006.01) |
| C09C 3/08 | (2006.01) |
| C08G 77/12 | (2006.01) |
| C08G 77/20 | (2006.01) |

(52) U.S. Cl.
CPC . *C08K 9/04* (2013.01); *C01B 33/18* (2013.01); *C08K 5/3472* (2013.01); *C08L 83/04* (2013.01); *C09C 1/3081* (2013.01); *C09C 3/00* (2013.01); *C09C 3/08* (2013.01); *C08G 77/12* (2013.01); *C08G 77/20* (2013.01)

(58) Field of Classification Search
None
See application file for complete search history.

(56) References Cited

U.S. PATENT DOCUMENTS

| | | | |
|---|---|---|---|
| 5,104,919 A | 4/1992 | Okami et al. | |
| 5,116,886 A | 5/1992 | Wolff et al. | |
| 5,936,054 A | 8/1999 | Achenbach et al. | |
| 5,977,249 A | 11/1999 | Kovar et al. | |
| 6,022,904 A * | 2/2000 | Sollradl et al. | 521/154 |
| 6,022,921 A * | 2/2000 | Achenbach et al. | 524/481 |
| 6,183,867 B1 | 2/2001 | Barthel et al. | |
| 6,251,969 B1 | 6/2001 | Woerner et al. | |
| 6,252,028 B1 | 6/2001 | Fehn et al. | |
| 6,359,098 B1 | 3/2002 | Fehn et al. | |
| 2006/0040116 A1* | 2/2006 | Ikeno | 428/447 |
| 2006/0094797 A1 | 5/2006 | Murotani et al. | |
| 2009/0092923 A1* | 4/2009 | Hayashi | 430/280.1 |
| 2010/0216920 A1* | 8/2010 | Kato et al. | 524/105 |
| 2013/0165560 A1* | 6/2013 | Belmont et al. | 524/105 |

FOREIGN PATENT DOCUMENTS

| | | |
|---|---|---|
| EP | 0388201 A2 | 9/1990 |
| EP | 0442143 A1 | 8/1991 |
| EP | 0822234 A1 | 2/1998 |
| EP | 0834534 A1 | 4/1998 |
| EP | 0926210 A1 | 6/1999 |
| EP | 0994159 A1 | 4/2000 |
| EP | 1006147 A1 | 6/2000 |
| EP | 1077226 A1 | 2/2001 |
| WO | 2012031183 A2 | 3/2012 |

* cited by examiner

*Primary Examiner* — Robert S Loewe
(74) *Attorney, Agent, or Firm* — Brooks Kushman P.C.

(57) ABSTRACT

Polyorganosiloxane compositions which are crosslinkable by means of hydrosilylation have improved compression set due to the incorporation of 3-amino-1,2,4-triazole-5-thiol bonded to silica.

8 Claims, No Drawings

ADDITION-CROSSLINKING SILICONE COMPOSITION WITH LOW COMPRESSION SET

CROSS REFERENCE TO RELATED APPLICATIONS

This application is the U.S. National Phase of PCT Appln. No. PCT/EP2013/064609 filed 10 Jul. 2013, which claims priority to German Application No. 10 2012 213 260.0 filed Jul. 27, 2012, the disclosures of which are incorporated in their entirety by reference herein.

BACKGROUND OF THE INVENTION

1. Field of the Invention

The invention relates to an addition-crosslinkable silicone mixture (S) comprising, as an additive, 3-amino-1,2,4-triazole-5-thiol bonded to silica.

2. Description of the Related Art

EP 0 834 534 A1 describes compositions which comprise organic sulfur compounds as additives for lowering compression set, these compositions being crosslinkable to give elastomers. The organic sulfur compounds can have been applied to an inorganic filler.

EP 0 442 143 A1 describes a process for the production of oxidic or silicatic fillers surface-modified with 3-thio-cyanatopropyltriethoxysilane or bis(3-trimethoxysilylpropyl) tetrasulfane.

The best reduction of compression set is achieved by 3-mercapto-1,2,4-triazole. U.S. Pat. No. 5,104,919 describes silicone compositions curable via addition crosslinking which comprise triazole compounds, among which is 3-mercapto-1,2,4-triazole.

To improve the dispersion thereof, the triazole compound is added to the composition in the form of a solution in an organic solvent. The rubber thus becomes slightly yellow and cloudy.

SUMMARY OF THE INVENTION

The invention provides an addition-crosslinkable silicone mixture (S), comprising:
(A) polyorganosiloxane comprising at least two alkenyl groups per molecule, with viscosity at 25° C. of from 0.2 to 1000 Pa·s,
(B) SiH-functional crosslinking agent,
(C) hydrosilylation catalyst, and
(D) from 10 to 200 ppm by weight, based on the silicone mixture (S), of 3-amino-1,2,4-triazole-5-thiol bonded to silica.

DETAILED DESCRIPTION OF THE PREFERRED EMBODIMENTS

The chemical linkage of the 3-mercapto-1,2,4-triazole to silica achieves a lower compression set of the vulcanizates without any need to accept clouding or yellow coloration. Surprisingly, it has moreover been found that the kick-off temperature of the addition-crosslinking silicone mixture (S) is lower than that of silicone mixtures with unbonded 3-mercapto-1,2,4-triazole, and that the vulcanization proceeds more satisfactorily, in particular more rapidly.

The polyorganosiloxane (A) comprising alkenyl groups preferably has the average general formula (1)

$$R^1_x R^2_y SiO_{(4-x-y)/2} \qquad (1),$$

in which
$R^1$ is a monovalent, optionally halogen- or cyano-substituted $C_1$-$C_{10}$-hydrocarbon moiety which comprises aliphatic carbon-carbon multiple bonds and which optionally is bonded by way of an organic divalent group to silicon,
$R^2$ is a monovalent, optionally halogen- or cyano-substituted $C_1$-$C_{10}$-hydrocarbon moiety bonded by way of an SiC bond, and free from aliphatic carbon-carbon multiple bonds,
x is a non-negative number such that at least two moieties $R^1$ are present in each molecule, and
y is a non-negative number such that (x+y) is in the range from 1.8 to 2.5.

The alkenyl groups $R^1$ are amenable to an addition reaction with an SiH-functional crosslinking agent (B). Alkenyl groups having from 2 to 6 carbon atoms are usually used, for example vinyl, allyl, methallyl, 1-propenyl, 5-hexenyl, ethynyl, butadienyl, hexadienyl, cyclopentenyl, cyclopentadienyl, and cyclohexenyl, preferably vinyl and allyl.

Organic divalent groups which can provide connection of the alkenyl groups $R^1$ to silicon of the polymer chain are composed, by way of example, of oxyalkylene units, for example those of the general formula (2)

$$-(O)_m[(CH_2)_nO]_o- \qquad (2),$$

in which
m is the value 0 or 1, in particular 0,
n is values from 1 to 4, in particular 1 or 2, and
o is values from 1 to 20, in particular from 1 to 5.

The oxyalkylene units of the general formula (2) are bonded on the left-hand side to a silicon atom.

The position of the bonds to the moieties $R^1$ can be anywhere along the polymer chain, in particular at the terminal silicon atoms.

Examples of unsubstituted moieties $R^2$ are alkyl moieties such as the methyl, ethyl, n-propyl, isopropyl, n-butyl, isobutyl, tert-butyl, n-pentyl, isopentyl, neopentyl, and tert-pentyl moieties, hexyl moieties such as the n-hexyl moiety, heptyl moieties such as the n-heptyl moiety, octyl moieties, for example the n-octyl moiety, and isooctyl moieties, for example the 2,2,4-trimethylpentyl moiety, nonyl moieties such as the n-nonyl moiety, decyl moieties such as the n-decyl moiety; alkenyl moieties such as the vinyl, allyl, n-5-hexenyl, 4-vinylcyclohexyl, and 3-norbornenyl moieties; cycloalkyl moieties such as the cyclopentyl, cyclohexyl, 4-ethylcyclohexyl, and cycloheptyl moieties, norbornyl moieties, and methylcyclohexyl moieties; aryl moieties such as the phenyl, biphenylyl, and naphthyl moieties; alkaryl moieties such as o-, m-, p-tolyl moieties and ethylphenyl moieties; aralkyl moieties such as the benzyl moiety, and the alpha- and the S-phenylethyl moieties.

Examples of substituted hydrocarbon moieties in the form of moieties $R^2$ are halogenated hydrocarbons, for example the chloromethyl, 3-chloropropyl, 3-bromopropyl, 3,3,3-trifluoropropyl, and 5,5,5,4,4,3,3-heptafluoropentyl moieties, and also the chlorophenyl, dichlorophenyl, and trifluorotolyl moieties.

It is preferable that $R^2$ has from 1 to 6 carbon atoms. Particular preference is given to methyl and phenyl.

Constituent (A) can also be a mixture of various polyorganosiloxanes which comprise alkenyl groups and which by way of example differ in alkenyl group content, in the nature of the alkenyl group, or structurally.

The structure of the polyorganosiloxanes (A) comprising alkenyl groups can be linear, cyclic, or else branched. The content of tri- and/or tetra-functional units leading to branched polyorganosiloxanes is typically very small, preferably at most 20 mol %, in particular at most 0.1 mol %.

It is particularly preferable to use polydimethylsiloxanes comprising vinyl groups, where molecules of these correspond to the general formula (3)

$$(ViMe_2SiO_{1/2})_2(ViMeSiO)_p(Me_2SiO)_q \quad (3),$$

where the non-negative integers p and q comply with the following relationships: p≥0, 50<(p+q)<20,000, preferably 200<(p+q)<1000, and 0<(p+1)/(p+q)<0.2. In particular, p=0.

The viscosity of the polyorganosiloxane (A) at 25° C. is preferably from 0.5 to 500 Pa·s, more preferably from 1 to 200 Pa·s, and most preferably from 1 to 100 Pa·s.

The composition of the organosilicon compound (B) comprising at least two SiH functions per molecule preferably has the average general formula (4)

$$H_aR^3_bSiO_{(4-a-b)/2} \quad (4),$$

in which
$R^3$ is a monovalent, optionally halogen- or cyano-substituted $C_1$-$C_{18}$-hydrocarbon moiety bonded by way of SiC and free from aliphatic carbon-carbon multiple bonds, and
a and b are non-negative integers,
with the proviso that 0.5<(a+b)<3.0 and 0<a<2, and that at least two silicon-bonded hydrogen atoms are present in each molecule.

Examples of $R^3$ are the moieties stated for $R^2$. It is preferable that $R^3$ has from 1 to 6 carbon atoms. Particular preference is given to methyl and phenyl.

It is preferable to use an organosilicon compound (B) comprising three or more SiH bonds per molecule. If an organosilicon compound (B) having only two SiH bonds per molecule is used, it is advisable to use a polyorganosiloxane (A) which has at least three alkenyl groups per molecule.

The hydrogen content of the organosilicon compound (B), based exclusively on the hydrogen atoms bonded directly to silicon atoms, is preferably in the range from 0.002 to 1.7% by weight of hydrogen, preferably from 0.1 to 1.7% by weight of hydrogen.

It is preferable that the organosilicon compound (B) comprises at least three and at most 600 silicon atoms per molecule. It is more preferable to use organosilicon compound (B) comprising from 4 to 200 silicon atoms per molecule. The structure of the organosilicon compound (B) can be linear, branched, cyclic, or network-like.

Particularly preferred organosilicon compounds (B) are linear polyorganosiloxanes of the general formula (5)

$$(HR^4_2SiO_{1/2})_c(R^4_3SiO_{1/2})_d(HR^4SiO_{2/2})_e(R^4_2SiO_{2/2})_f \quad (5),$$

where
$R^4$ is defined as for $R^3$, and
the non-negative integers c, d, e, and f comply with the following relationships: (c+d)=2, (c+e)>2, 5<(e+f)<200, and 1<e/(e+f)<0.1.

The quantity of the SiH-functional organosilicon compound (B) contained in the crosslinkable silicone composition is preferably such that the molar ratio of SiH groups to alkenyl groups is from 0.5 to 5, in particular from 1.0 to 3.0.

The hydrosilylation catalyst (C) can be any catalysts which catalyze the hydrosilylation reactions that proceed during the crosslinking of addition-crosslinking silicone mixtures.

Particular hydrosilylation catalysts (C) are metals and compounds thereof from the group of platinum, rhodium, palladium, ruthenium, and iridium.

It is preferable to use platinum and platinum compounds. Particular preference is given to those platinum compounds that are soluble in polyorganosiloxanes. Examples of soluble platinum compounds that can be used are the platinum-olefin complexes of the formulae $(PtCl_2.olefin)_2$ and $H(PtCl_3.olefin)$, and it is preferable here to use alkenes having from 2 to 8 carbon atoms, for example ethylene, propylene, isomers of butene and of octane, or cycloalkenes having from 5 to 7 carbon atoms, for example cyclopentene, cyclohexene, and cycloheptene. Other soluble platinum catalysts are the platinum-cyclopropane complex of the formula $(PtCl_2C_3H_6)_2$, the reaction products of hexachloroplatinic acid with alcohols, with ethers, and with aldehydes and, respectively, mixtures of the same, or of the reaction product of hexachloroplatinic acid with methylvinylcyclotetrasiloxane in the presence of sodium bicarbonate in ethanolic solution. Particular preference is given to complexes of platinum with vinylsiloxanes, for example sym-divinyltetramethyldisiloxane. The platinum compounds described in U.S. Pat. No. 6,359,098 (EP 1 077 226 A1) and U.S. Pat. No. 6,252,028 (EP 0 994 159 A1) are likewise very suitable, and the relevant disclosure relating thereto is incorporated herein by way of reference.

The hydrosilylation catalyst (C) can be used in any desired form, for example in the form of microcapsules comprising hydrosilylation catalyst, or of polyorganosiloxane particles, as described in U.S. Pat. No. 6,251,969 (EP 1 006 147 A1), and the relevant disclosure relating thereto incorporated herein by way of reference.

The content of hydrosilylation catalysts (C) is preferably selected in such a way that the Pt content of the addition-crosslinkable silicone mixture (S) is from 0.1 to 200 ppm by weight, in particular from 0.5 to 40 ppm by weight.

Component (D) is preferably a 3-amino-1,2,4-triazole-5-thiol bonded to the silica at the 3-amino group by way of a divalent organic group.

The 3-amino-1,2,4-triazole-5-thiol (D) bonded to silica by way of a divalent organic group is likewise provided by the invention.

Component (D) can preferably be produced via an addition reaction of 3-amino-1,2,4-triazole-5-thiol onto an epoxy group bonded to the silica by way of a divalent organic group. It is preferable that the divalent organic group provided here, bonded on the left-hand side to a silicon atom of the silica and bearing an epoxy group on the right-hand side has the structure of the general formula (6)

$$-(CH_2)_g[O(CH_2)_h]_i(CH_2)_k- \quad (6),$$

in which
g is from 1 to 10, in particular from 1 to 4,
h is from 1 to 4, in particular 2 or 3,
i is 0, 1, 2, or 3, in particular 1, and
k is from 1 to 10, in particular from 1 to 5.

It is preferable that the divalent organic group bonded to a silicon atom of the silica and bearing an epoxy group is produced via reaction between silica and an epoxyalkoxysilane which has an epoxy group linked by way of a divalent organic group.

Examples of suitable epoxyalkoxysilanes are glycidoxypropyltrimethoxysilane, glycidoxypropyldimethoxymethylsilane glycidoxyhexyltrimethoxysilane and glycidoxyhexyldimethoxymethylsilane.

The silica in component (D) is preferably fumed silica or precipitated silica, preferably with a BET surface area of at least 50 m²/g, in particular from 100 to 400 m²/g.

The reaction time for the reaction of an epoxyalkoxysilane with silica is preferably from 1 h to 3 days, more preferably from 6 h to 2 days, and in particular from 12 to 36 h. The reaction temperature is preferably from 20° C. to 100° C., in particular from 40° C. to 80° C. The reaction pressure is preferably from 0.1 to 10 bar, in particular from 0.5 to 2 bar.

The quantity of epoxyalkoxysilane used per gram of silica is preferably from 0.01 to 0.9 g, more preferably from 0.05 to 0.5 g, and in particular from 0.1 to 0.3 g.

It is preferable that the silica which bears an epoxy group by way of a divalent organic group is then reacted with 3-amino-1,2,4-triazole-5-thiol to give component (D).

The preferred reaction time for the reaction between silica which bears an epoxy group by way of a divalent organic group and 3-amino-1,2,4-triazole-5-thiol is from 1 h to 3 days, more preferably from 6 h to 2 days, and in particular from 12 to 36 h. It is preferable that the reaction temperature is from 20° C. to 100° C., in particular from 40° C. to 80° C. It is preferable that the reaction pressure is from 0.1 to 10 bar, in particular from 0.5 to 2 bar.

The quantity of 3-amino-1,2,4-triazole-5-thiol used per mole of epoxy groups on the silica is preferably from 0.8 to 1.5 mol, more preferably from 0.9 to 1.1 mol.

After the addition reaction between 3-amino-1,2,4-triazole-5-thiol and the epoxy group bonded to the silica by way of a divalent organic group, it is preferable that remaining free silanol groups on the silica surface in the resultant component (D) are post-hydrophobized via treatment with organosilane, organosilazane, or organosiloxane. Particular preference is given to post-hydrophobization with hexamethyldisilazane. The post-hydrophobization achieves an additional reduction of compression set.

The content of the 3-amino-1,2,4-triazole-5-thiol (D) bonded to silica is preferably from 20 to 120 ppm by weight, in particular from 30 to 90 ppm by weight, based in each case on the silicone mixture (S).

The silicone mixture (S) can comprise not only the silica linked to 3-amino-1,2,4-triazole-5-thiol (D) but also at least one other filler (E).

Examples of non-reinforcing fillers (E) with BET surface area of up to 50 m²/g are quartz, diatomaceous earth, calcium silicate, zirconium silicate, zeolites, metal oxide powders, for example aluminum oxides, titanium oxides, iron oxides, and zinc oxides, and mixed oxides of these, barium sulfate, calcium carbonate, gypsum, silicon nitride, silicon carbide, boron nitride, glass powder, and plastics powder. Reinforcing fillers, i.e. fillers with BET surface area of at least 50 m²/g, in particular from 100 to 400 m²/g, are by way of example fumed silica, precipitated silica, aluminum hydroxide, carbon black, for example furnace black and acetylene black, and silicon-aluminum mixed oxides with large BET surface area. The fillers (E) mentioned can have been hydrophobized, by way of example via treatment with organosilanes, with organosilazanes, or with organosiloxanes, or via etherification of hydroxy groups to give alkoxy groups. It is possible to use one type of filler (E), and it is also possible to use a mixture of at least two fillers (E).

The silicone mixtures (S) preferably comprise at least 3% by weight, more preferably at least 5% by weight, in particular at least 10% by weight, and at most 40% by weight, of filler (E).

The silicone mixtures (S) can if desired comprise, as further constituent (F), a proportion of from 0 to 70% by weight of possible additives, preferably from 0.0001 to 40% by weight. These additives can, by way of example, be resinous polyorganosiloxanes, where these differ from the polyorganosiloxanes (A) and (B), dispersing agents, solvents, adhesion promoters, pigments, dyes, plasticizers, organic polymers, heat stabilizers, and inhibitors. Among these are additives such as dyes and pigments. Other constituents can be constituents having thixotropic action, for example fine-particle silica or other commercially available thixotropy additives. A further constituent (F), which is a peroxide, used in order to improve crosslinking, is preferably present in at most 0.5% by weight, more preferably at most 0.3% by weight, and in particular <0.1% by weight.

Other additives that serve for controlled adjustment of processing time, kick-off temperature, and crosslinking rate of the crosslinking compositions can be present. These inhibitors and stabilizers are very well known in the field of crosslinking compositions.

The present invention further provides a process for the production of the addition-crosslinkable silicone mixtures (S), a process for the production of the crosslinked silicone elastomers made of the silicone mixtures (S), and also the silicone elastomer moldings thus obtainable.

The production or compounding of the silicone mixtures (S) is preferably achieved via mixing of components (A) and (D) and optionally filler (E). The crosslinking after addition of crosslinking agent (B) and hydrosilylation catalyst (C) is preferably achieved via heating, preferably at from 30 to 250° C., with greater preference at at least 50° C., and in particular at at least 100° C., and with greatest preference at from 150-210° C.

The definitions of all of the above symbols in the above formulae are respectively mutually independent. The silicon atom is tetravalent in all of the formulae. The entirety of all of the constituents of the silicone mixture (S) gives 100% by weight.

Unless otherwise stated, all quantitative and percentage data in the examples below are based on weight, all pressures are 0.10 MPa (abs.), and all temperatures are 20° C.

Inventive Example 1

100 g of fumed silica with BET surface area of 300 m²/g (which can be purchased as HDK® T30 from Wacker Chemie AG) are reacted with 18.0 g (0.076 mol) of glycidoxypropyltrimethoxysilane (which can be purchased as GENIOSIL® GF 80 from Wacker Chemie AG) as in EP 0 926 210 B2 by analogy with example 7 in that document. Elemental analysis shows that the product obtained has 0.75 mmol of epoxy functionality for each gram of silylated silica. 6.097 g (52.5 mmol) of 3-amino-1,2,4-triazole-5-thiol in 3.5 L of methanol are then used as an initial charge, and 70 g (corresponding to 52.5 mmol of epoxy functionality) of the silylated silica produced above are added in portions. Once addition has ended, the mixture is heated for a further 24 hours at reflux. The solvent is then drawn off on a rotary evaporator. This gives 66.85 g (88% of theory) of a white powder. Elemental analysis shows the extent of bonding of 3-amino-1,2,4-triazole-5-thiol to be quantitative in relation to sulfur content and 90% in relation to nitrogen content. ¹H NMR spectrum shows that 3-amino-1,2,4-triazole-5-thiol has been bonded with 92% selectivity by way of the 3-amino group, with ring-opening, to the epoxy group.

Inventive Example 2

Production of compression set masterbatch: 15 g of a vinyl-terminated, linear polydimethylsiloxane with a viscosity of 20,000 mPa s ("vinyl polymer 20,000") are used as an initial charge in a laboratory kneader. 8.7 g of the 3-amino-1,2,4-triazole-5-thiol-containing silica described above are then incorporated in portions, with continuous kneading. The mixture is then kneaded for one more hour. A further 51.7 g of vinyl polymer 20 000 are then incorporated in portions, and the mixture is kneaded for one further hour. Yield 60.0 g (80% of theory).

Inventive Example 3

A crosslinked silicone elastomer is produced by analogy with ELASTOSIL® 3005/40 from Wacker Chemie AG comprising components (A), (B), (C) and (E), with 0.7% by weight of the compression set masterbatch described at an earlier stage above as component (D) (the corresponding content of the silica-bonded active ingredient 3-amino-1,2,4-triazole-5-thiol being 70 ppm). The elastomer is colorless and transparent. The compression set in accordance with DIN ISO 815 after 7 days at a temperature of 175° C. is 44%.

Inventive Example 4

Remaining silanol groups present on the surface of the silica produced in inventive example 1 with bonded 3-amino-1,2,4-triazole-5-thiol (D) are subjected to post-hydrophobization: 140 mL of hexamethyldisiloxane (which can be purchased as AK 065 oil from Wacker Chemie AG) are used as an initial charge under nitrogen in a 250 mL three-necked flask with reflux condenser. To this are added the following: first 2.77 g of hexamethyldisilazane and then, with grounding, 16 g of the 3-amino-1,2,4-triazole-5-thiol-functionalized silica described in inventive example 1. The mixture is then heated to 80° C. during a period of 30 minutes, and stirred for a further 2 hours at this temperature. The mixture is allowed to cool to room temperature, with stirring, and then to stand for a further 16 hours at room temperature, and then evaporated to dryness on a rotary evaporator at 65° C. with stepwise pressure reduction, the final pressure being <1.0 mbar for 20 minutes. The agglomerated powder is comminuted and dried for a further 2 hours in a drying oven at 120° C. under a gentle stream of nitrogen. Yield: 13.5 g (92% of theory).

Inventive Example 5

Production of compression set masterbatch: 15 g of a vinyl-terminated, linear polydimethylsiloxane with viscosity of 20,000 mPa s ("vinyl polymer 20 000") are used as an initial charge in a laboratory kneader. 6.9 g of the silica described in inventive example 4, containing 3-amino-1,2,4-triazole-5-thiol and post-hydrophobized with hexamethyldisilazane, are then incorporated in portions with continuous kneading. The mixture is then kneaded for one more hour. A further 38.1 g of vinyl polymer 20,000 are then incorporated in portions, and the mixture is kneaded for one further hour. Yield 45.3 g (76% of theory).

Inventive Example 6

A crosslinked silicone elastomer is produced by analogy with ELASTOSIL® 3005/40 from Wacker Chemie AG comprising components (A), (B), (C) and (E), and comprises 0.7% by weight of the post-hydrophobized compression set masterbatch described above (the corresponding content of the silica-bonded active ingredient 3-amino-1,2,4-triazole-5-thiol being 70 ppm). The elastomer is colorless and transparent. The compression set in accordance with DIN ISO 815 after 7 days at a temperature of 175° C. is 36%.

Comparative Example 1

A crosslinked silicone elastomer is produced as in inventive examples 3 and 6, but without any compression set masterbatch. The elastomer is colorless and transparent. The compression set in accordance with DIN ISO 815 after 7 days at a temperature of 175° C. is 87%.

Comparative Example 2

A crosslinked silicone elastomer is produced as in inventive examples 3 and 6, but with the compression set masterbatch described below.

6.9 g of fumed silica with BET surface area of 300 m²/g (which can be purchased as HDK® T30 from Wacker Chemie AG) are mixed with a solution of 1 g of 3-amino-1,2,4-triazole-5-thiol in 5 g of water, and the water is removed by evaporation.

15 g of a vinyl-terminated, linear polydimethylsiloxane with viscosity of 20,000 mPa s ("vinyl polymer 20,000") are used as an initial charge in a laboratory kneader. The 3-amino-1,2,4-triazole-5-thiol-containing silica described above is then incorporated in portions, with continuous kneading. The mixture is then kneaded for one more hour. A further 51.7 g of vinyl polymer 20,000 are then incorporated in portions, and the mixture is kneaded for one further hour. Yield 58.5 g (78% of theory).

The elastomer has a slightly yellowish coloration and is slightly cloudy. Compression set in accordance with DIN ISO 815 after 7 days at a temperature of 175° C. is 46%.

Reaction of HDK® T30 with Geniosil GF 80® in inventive example 1:

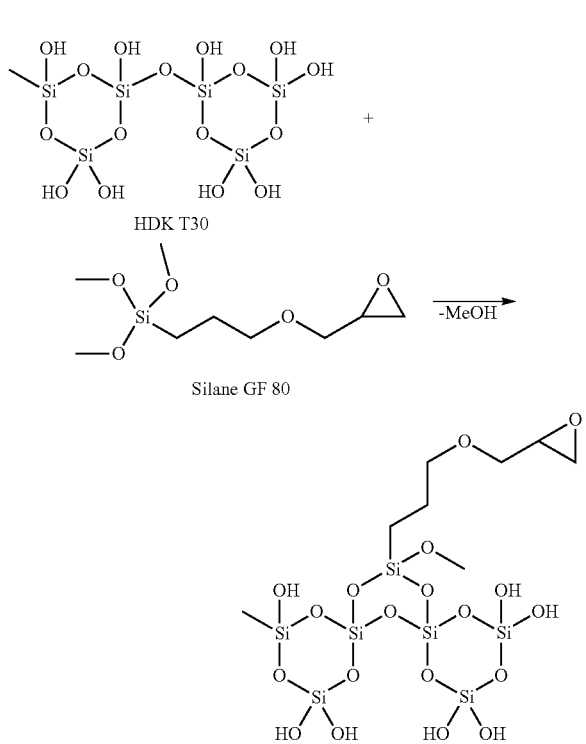

Addition reaction of 3-amino-1,2,3-triazole-5-thiol, with ring-opening, onto the epoxy group of silica-bonded Geniosil GF 80® in inventive example 1:

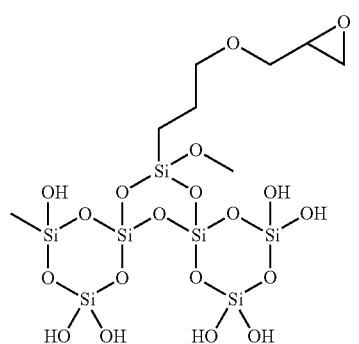

HDK T30 + GF 80

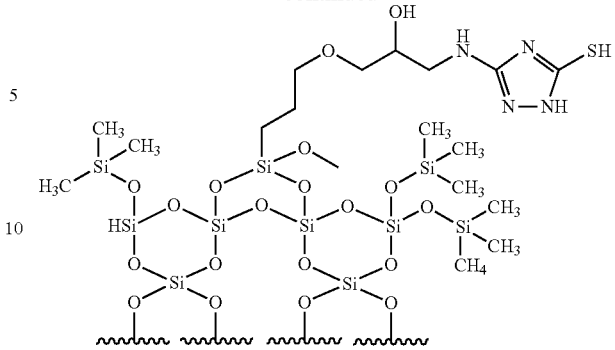

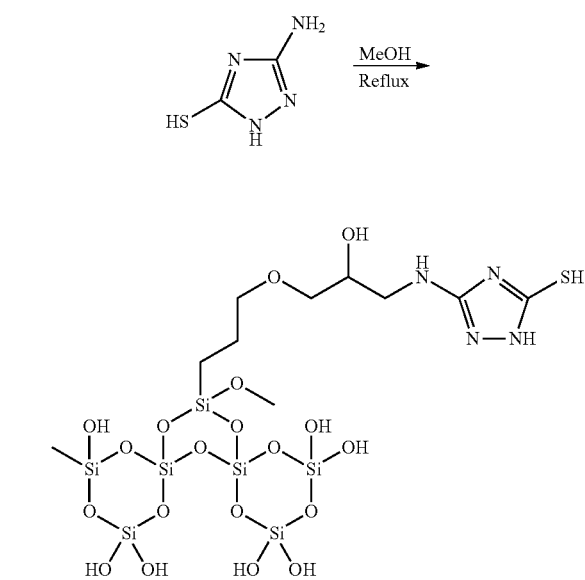

Post-hydrophobization of the remaining silanol groups on the silica surface in inventive example 4:

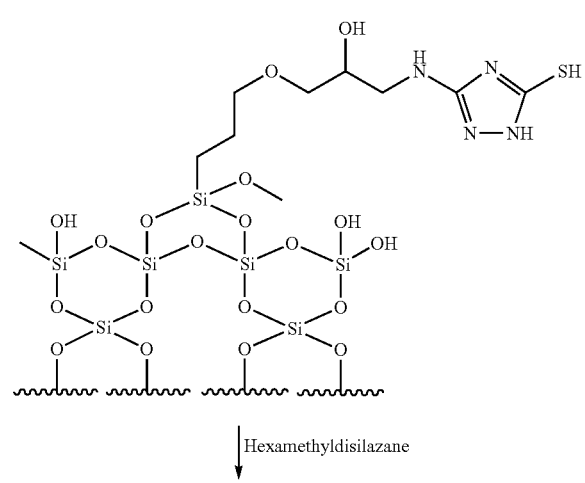

What is claimed is:

1. An addition-crosslinkable silicone mixture (S) comprising
    (A) at least one polyorganosiloxane comprising at least two alkenyl groups per molecule, with viscosity at 25° C. of from 0.2 to 1000 Pa·s,
    (B) at least one SiH-functional crosslinking agent,
    (C) at least one hydrosilylation catalyst, and
    (D) from 10 to 200 ppm by weight, based on the silicone mixture (S), of 3-amino-1,2,4-triazole-5-thiol, bonded to silica.

2. The addition-crosslinkable silicone mixture (S) of claim 1, in which polydimethylsiloxanes comprising vinyl groups are used as polyorganosiloxane (A), corresponding to the formula (3)

$$(ViMe_2SiO_{1/2})_2(ViMeSiO)_p(Me_2SiO)_q \qquad (3),$$

where

Vi is a vinyl moiety and Me is a methyl moiety, and the non-negative integers p and q comply with the following relationships: $p \geq 0$, $50 < (p+q) < 20{,}000$, $200 < (p+q) < 1000$, and $0 < (p+1)/(p+q) < 0.2$.

3. The addition-crosslinkable silicone mixture (S) of claim 1, in which polydimethylsiloxanes comprising vinyl groups are used as polyorganosiloxane (A), corresponding to the formula (3)

$$(ViMe_2SiO_{1/2})_2(ViMeSiO)_p(Me_2SiO)_q \qquad (3),$$

where

Vi is a vinyl moiety and Me is a methyl moiety, and the non-negative integers p and q comply with the following relationships: $p \geq 0$, $50 < (p+q) < 20{,}000$, $50 < (p+q) < 20{,}000$, and $0 < (p+1)/(p+q) < 0.2$.

4. The addition-crosslinkable silicone mixture (S) of claim 1, in which an organosilicon compound (B) comprising at least two SiH functions per molecule is used as an SiH-functional crosslinking agent (B), and has the average formula (4)

$$H_aR^3_bSiO_{(4-a-b)/2} \qquad (4),$$

in which $R^3$ is a monovalent, optionally halogen- or cyano-substituted $C_1$-$C_{18}$-hydrocarbon moiety bonded by way of SiC and free from aliphatic carbon-carbon multiple bonds, and a and b are non-negative integers, with the proviso that $0.5 < (a+b) \leq 3.0$ and $0 < a < 2$, and that at least two silicon-bonded hydrogen atoms are present in each molecule.

5. The addition-crosslinkable silicone mixture (S) of claim 1, in which the hydrosilylation catalyst (C) is a metal or compound thereof of platinum, rhodium, palladium, ruthenium, and/or iridium.

6. The addition-crosslinkable silicone mixture (S) of claim 1, in which component (D) is a 3-amino-1,2,4-triazole-5-thiol bonded to the silica at the 3-amino group by way of a divalent organic group.

7. The addition-crosslinkable silicone mixture (S) of claim 1, which comprises at least one other filler (E).

8. A process for the production of 3-amino-1,2,4-triazole-5-thiol (D) bonded to silica by way of a divalent organic group, comprising:
- in a first step, reacting an epoxyalkoxysilane having an epoxy group linked to silicon by way of a divalent organic group with silica, and
- in a second step, reacting the silica which bears an epoxy group by way of a divalent organic group with 3-amino-1,2,4-triazole-5-thiol to give component (D), and the second step is followed by treatment with organosilane, organosilazane, or organosiloxane for post-hydrophobization of remaining free silanol groups on the silica surface in component (D).

* * * * *